(12) United States Patent
Selinger

(10) Patent No.: US 12,333,789 B2
(45) Date of Patent: Jun. 17, 2025

(54) USING GUARD FEEDBACK TO TRAIN AI MODELS

(71) Applicant: Deep Sentinel Corp., Pleasanton, CA (US)

(72) Inventor: David Lee Selinger, Pleasanton, CA (US)

(73) Assignee: DEEP SENTINEL CORP., Pleasanton, CA (US)

( * ) Notice: Subject to any disclaimer, the term of this patent is extended or adjusted under 35 U.S.C. 154(b) by 572 days.

(21) Appl. No.: 17/705,346

(22) Filed: Mar. 27, 2022

(65) Prior Publication Data

US 2023/0316726 A1 Oct. 5, 2023

(51) Int. Cl.
*G06V 10/774* (2022.01)
*G06V 10/40* (2022.01)
*G06V 10/778* (2022.01)

(52) U.S. Cl.
CPC .......... *G06V 10/7747* (2022.01); *G06V 10/40* (2022.01); *G06V 10/7792* (2022.01)

(58) Field of Classification Search
CPC . G06V 10/7747; G06V 10/40; G06V 10/7792
See application file for complete search history.

(56) References Cited

U.S. PATENT DOCUMENTS

| | | | |
|---|---|---|---|
| 9,176,987 B1 | 11/2015 | Peng et al. | |
| 9,501,915 B1 * | 11/2016 | Laska | G06F 3/04847 |
| 11,165,954 B1 * | 11/2021 | Beach | H04N 23/65 |
| 2008/0193010 A1 | 8/2008 | Eaton et al. | |
| 2012/0163670 A1 * | 6/2012 | Eaton | G08B 13/19608 382/103 |
| 2015/0356461 A1 | 12/2015 | Vinyals et al. | |
| 2018/0089588 A1 * | 3/2018 | Ravi | G06F 7/08 |
| 2018/0315301 A1 * | 11/2018 | Subramanian | G06V 10/765 |
| 2019/0095716 A1 * | 3/2019 | Shrestha | G08B 21/187 |
| 2019/0311201 A1 | 10/2019 | Selinger et al. | |
| 2023/0262234 A1 * | 8/2023 | Amini | H04L 43/0858 709/219 |

FOREIGN PATENT DOCUMENTS

EP 3989194 A1 * 4/2022 ........... G05D 1/0094

OTHER PUBLICATIONS

J. Xie, Y. Pang, J. Nie, J. Cao and J. Han, "Latent Feature Pyramid Network for Object Detection," in IEEE Transactions on Multimedia, vol. 25, pp. 2153-2163, 2023, doi: 10.1109/TMM.2022.3143707. (Year: 2022).*

(Continued)

*Primary Examiner* — Wassim Mahrouka
(74) *Attorney, Agent, or Firm* — Seed IP Law Group LLP

(57) ABSTRACT

A system and method for training an AI model. A recorded video is divided into video frames that are input and read by a processor that identifies objects in the video frames using the object's latent characteristics. The processor further classifies an event based on the identified object, the latent characteristics, and surrounding factors at the time the object is identified. Video frames are annotated based on the identified object and classified event. A user's responses to annotated frames are tracked and the latent characteristics are adjusted based on the user's responses.

42 Claims, 6 Drawing Sheets

(56) References Cited

OTHER PUBLICATIONS

Mirra, G. et al., "Expertise, playfulness and analogical reasoning: three strategies to train Artificial Intelligence for design applications", Architecture, Structures and Constructions 2.1, pp. 111-127 (2022).

Xie et al., "Latent feature pyramid network for object detection", IEEE Transactions on Multimedia, vol. 25, pp. 2153-2163 (2022).

International Search Report and Written Opinion issued in correspondence International Application No. PCT/US2023/015962, dated Jun. 15, 2023.

* cited by examiner

400

Powered POE/wireless powered camera: X = 30s, MIN=10s, MAX=2 MIN

|  | In protection zone/ performing "suspect" behavior | Outside protection zone, predicted to enter | Outside protection zone |
|---|---|---|---|
| Person | Escalate now | Hold indefinitely | Hold for MIN seconds after last seen |
| Car | Hold for X seconds | Hold for X seconds | Hold for MIN seconds after last seen |
| Animal | Hold for X seconds | MIN | MIN |
| Other | MIN | MIN | MIN |

Aggressive POE/wireless powered: X = 60, MIN=15s, MAX=2 MIN

|  | In protection zone/ performing "suspect" behavior | Outside protection zone, predicted to enter | Outside protection zone |
|---|---|---|---|
| Person | Escalate now | Escalate now | Hold for MIN seconds after last seen. |
| Car | Hold indefinitely | Hold indefinitely | Hold for MIN seconds after last seen |
| Animal | Hold for X seconds | MIN | MIN |
| Other | MIN | MIN | MIN |

Wireless/battery camera: X = 15s, MIN=5s, MAX=2 MIN

|  | In protection zone/ performing "suspect" behavior | Outside protection zone, predicted to enter | Outside protection zone |
|---|---|---|---|
| Person | Escalate now | Hold for 2X seconds | Hold for MIN seconds after last seen. |
| Car | Hold for X seconds | Hold for X seconds | Hold for MIN seconds after last seen up to X Seconds total |
| Animal | MIN | MIN | MIN |
| Other | MIN | MIN | MIN |

Aggressive settings wireless: X = 30s, MIN=10s, MAX=2 MIN

|  | In protection zone/ performing "suspect" behavior | Outside protection zone, predicted to enter | Outside protection zone |
|---|---|---|---|
| Person | Escalate now | Escalate now | Hold for MIN seconds after last seen |
| Car | Hold indefinitely | Hold indefinitely | Hold for MIN seconds after last seen up to X Seconds total |
| Animal | Hold for X seconds | MIN | MIN |
| Other | MIN | MIN | MIN |

FIG. 4D

USING GUARD FEEDBACK TO TRAIN AI MODELS

TECHNICAL FIELD

Various embodiments relate generally to tools for training AI models.

BACKGROUND

Artificial Intelligence (AI) is a branch of computer science that deals with intelligent behavior, learning, and adaptation in machines. Research in AI is traditionally concerned with producing machines to automate tasks requiring intelligent behavior. While many researchers have attempted to create AI systems, there is very limited prior work on adaptive security systems that improve the process of event classification and/or escalation based on security guard responses to a previously issued alert by the system.

While great advances have been made in the area of artificial intelligence, the performance of software-only systems often falls short of that which is needed for applications involving analysis of physical world imagery, video, language processing, and the like. Key challenges for end users are the prevalence of false positives ("false alarms"), the variation in system performance caused by changes in circumstances or scene type ("brittleness"), and the inability for these systems to produce human-like outputs in scenarios that are highly subjective or contextual (as is frequently the case in the physical security domain). The current subject matter includes data analysis and handling that tracks and evaluates human responses and activity alongside artificial intelligence to address the aforementioned challenges.

SUMMARY

In an aspect, image data is received as input for analysis by a processor to detect and classify objects in the images. The image data can be of a security system asset that is an imaging device, a video camera, a still camera, a radar imaging device, a microphone, a chemical sensor, an acoustic sensor, a radiation sensor, a thermal sensor, a pressure sensor, a force sensor, or a proximity sensor.

The image data can include a single image, a series of images, or a video. The processing task performed by the processor can include: detecting a pattern in the image; detecting a presence of an object within the image; detecting a presence of a person within the image; detecting intrusion of the object or person within a region of the image; detecting suspicious behavior of the person within the image; detecting an activity of the person within the image; detecting an object carried by the person, detecting a trajectory of the object or the person in the image; a status of the object or person in the image; identifying whether a person who is detected is on a watch list; determining whether a person or object has loitered for a certain amount of time; detecting interaction among person or objects; tracking a person or object; determining status of a scene or environment; determining the sentiment of one or more people; counting the number of objects or people; determining whether a person appears to be lost; and/or determining whether an event is normal or abnormal or a sufficient threat to trigger an alarm. Furthermore, there is no need to identify actual objects in the image since the system is configured to identify latent features of objects. These latent features may later be used to identify the objects themselves. Latent features may be considered the essential characteristics of the object without extraneous information about the object that is normally associated with the object. For example, the height, weight, and color of an object may be considered extraneous information that is not necessary for defining the object and therefore not a latent feature. For purposes of this application, the terms "latent feature," "latent parameter," and "latent characteristic" shall be regarded as equivalent terms and may be used interchangeably. In addition, using latent features may be considered a form of data compression since latent features are a smaller data set than the original data that describes the object. Moreover, latent space may be considered a further abstraction of latent features where latent space is a 2-dimensional, 3-dimensional (or multi-dimensional) construct in which coordinate points may be used to represent one or more latent features. Latent feature data can thus be represented in latent space and conclusions can be drawn about objects based on the latent space representation of the latent features, such as a degree of similarity between objects based on a distance between coordinate points in the latent space. For example, clusters and manifolds representing subsets of similar latent feature data in the latent space convey information about objects without having to process all of the image data associated with the objects. One of ordinary skill in the art will recognize that a plurality of relational aspects in the latent space may be used to draw conclusions about different objects.

Latent features detected in the image may be used by the processor which utilizes a predictive model trained on using the latent features to classify the object and/or make predictions about the object. The processor may also use an annotation module to annotate an image with information about the latent features, the object, the environment, a level of threat posed by the object, and/or instructions to a security guard.

Processing by the processor can be requested and a result and a confidence measure of the result from the processor can be received. The confidence measure of the result can exceed a predefined threshold. The image data can be provided to the processor as an input and the result from the processor can be provided to a machine computation component as supervisory data to train a predictive model of the machine computation component.

The machine computation component can include a deep learning artificial intelligence classifier, a deep neural network, and/or a convolutional neural network. The machine computation component can detect latent features of objects and classify objects in the image data. At least one of the receiving, classifying, and providing can be performed by at least one data processor forming part of at least one computing system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIGS. 4A-D are schematic diagrams of tables used by an exemplary AI system to control one or more cameras according to an embodiment of the present invention.

Like reference symbols in the various drawings indicate like elements.

DETAILED DESCRIPTION OF ILLUSTRATIVE EMBODIMENTS

Figure 1:
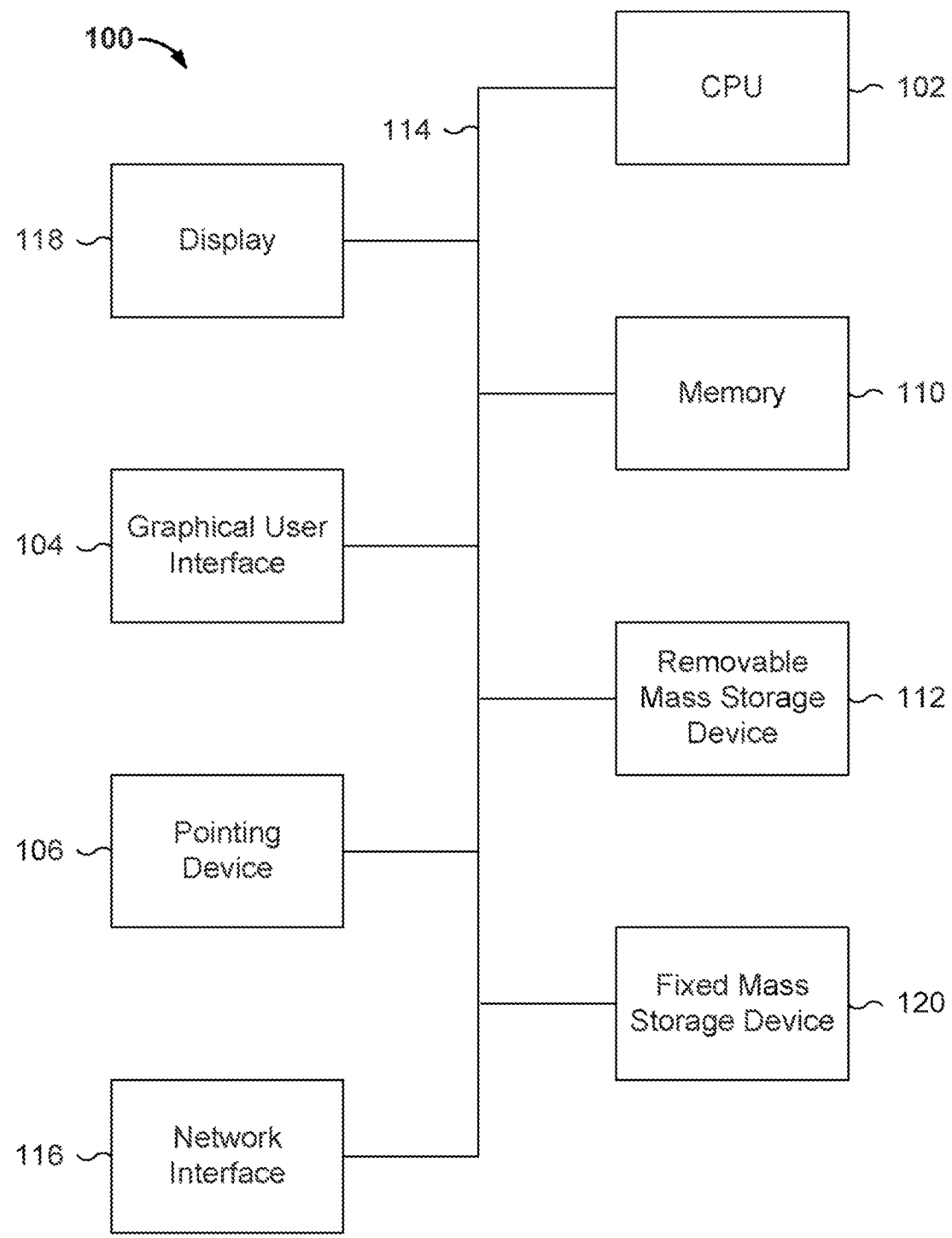
FIG. 1 is a block diagram of a computer system used in one or more embodiments of the present invention.

FIG. 1 is a block diagram of a computer system 100 used in some embodiments to perform annotation and object tracking, including video annotation and video object tracking. In particular, FIG. 1 illustrates one embodiment of a general purpose computer system. Other computer system architectures and configurations can be used for carrying out the processing of the disclosed technique. Computer system 100, made up of various subsystems described below, includes at least one microprocessor subsystem (also referred to as a central processing unit, or CPU) 102. That is, CPU 102 can be implemented by a single-chip processor or by multiple processors. In some embodiments, CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as is well known in the art, primary storage typically includes basic operating instructions, program code, data, and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storages 112, 120 generally store additional programming instructions, data, and the like that typically are not in active use by the CPU 102. It will be appreciated that the information retained within mass storages 112, 120 may be incorporated, if needed, in standard fashion as part of primary storage 110 (e.g., RAM) as virtual memory.

In addition to providing CPU 102 access to storage subsystems, bus 114 can be used to provide access to other subsystems and devices as well. In the described embodiment, these can include a display 118, a network interface 116, a graphical user interface 104, and a pointing device 106, as well as an auxiliary input/output device interface, a sound card, speakers, and other subsystems as needed. The pointing device 106 may be a mouse, stylus, track ball, or tablet, and is useful for interacting with graphical user interface 104.

In some embodiments, a video or series of images is received as an input to the computer system 100 and CPU 102 pre-processes the video or series of images to break up the video or series of images into frames that can be displayed on display 118.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the disclosed technique may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the disclosed technique further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the disclosed technique, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 1 is but an example of a computer system suitable for use with the disclosed technique. Other computer systems suitable for use with the disclosed technique may include additional or fewer subsystems. In addition, bus 114 is illustrative of any interconnection scheme serving to link the subsystems. Other computer architectures having different configurations of subsystems may also be utilized.

While great advances have been made in the area of artificial intelligence, the performance of software-only systems often falls short of that which is needed for applications involving analysis of physical world imagery and video. Key challenges for end users are the prevalence of false positives ("false alarms"), the variation in system performance caused by changes in circumstances or scene type, and the inability for these systems to produce human-like outputs in scenarios that are highly subjective or contextual (as is frequently the case in the physical security domain). The current subject matter includes data analysis and handling that tracks, records, and evaluates human agent responses to security alerts issued by an artificial intelligence (AI) system such as the intelligent network hub described in U.S. patent application Ser. No. 15/948,531 (Camera Power Management by a Network Hub with Artificial Intelligence), filed Apr. 9, 2018, hereinafter referred to as the '531 Application and which is incorporated herein by referenced.

The AI system can include an analysis platform for improving machine processing by monitoring human responses to security notifications from the AI system in order to improve performance and reduce false alarms. The analysis platform can be part of, for example, the intelligent network hub illustrated in FIG. 1 of the '531 Application and can include predictive models built using a machine learning algorithm, for example, a deep learning neural network. The AI system can classify objects and/or events identified in images into one or more classes and annotate images, such as video frame images with object identifiers, bounding boxes, security alerts, and/or instructions to human agents, such as security guards.

The analysis platform can be run by the processor and is configured to monitor and track agent responses, such as inspecting an image in a video frame, requesting camera video history, and the like. In some implementations, the analysis platform can be applied to a security deployment, which is highly subjective and contextual. In some implementations, the analysis platform can be applied to a number of deployment types including closed circuit television, surveillance camera, retail camera, mobile device, body cameras, drone footage, personnel inspection systems, object inspection systems, and the like. Other deployment types are possible.

The current subject matter can include dynamically retrieving additional agent input for false alarm reduction. The current subject matter can programmatically query agents to achieve a confidence objective, which can relate to a false alarm objective. For example, the platform can start with querying an initial set of agents (e.g., 2), and if there is disagreement between them, the platform can query additional agents to provide feedback, so that the network can grow more confident until a high-confidence result is determined. If the aggregate answer will trigger a false alarm, the platform can obtain additional queries.

The current subject matter can coordinate use and gathering of agent (e.g., security guard) responses, including: how long the guard viewed the video; whether the guard investigated the video further; whether the guard requested additional information about the property; whether the guard requested additional information about other cameras; whether the guard requested additional information about a camera's history whether the guard requested information about the residents of the property; whether the guard clicked on an intervention button to speak: whether the guard sounded an alarm; whether the guard sent a package-delivery notification to the end user; whether the guard called the police; whether the guard called the end user; whether the guard hovered their mouse over the video; whether the guard filed a customer care ticket against this video; whether the guard respond to a customer request; or any other query.

Figure 2:
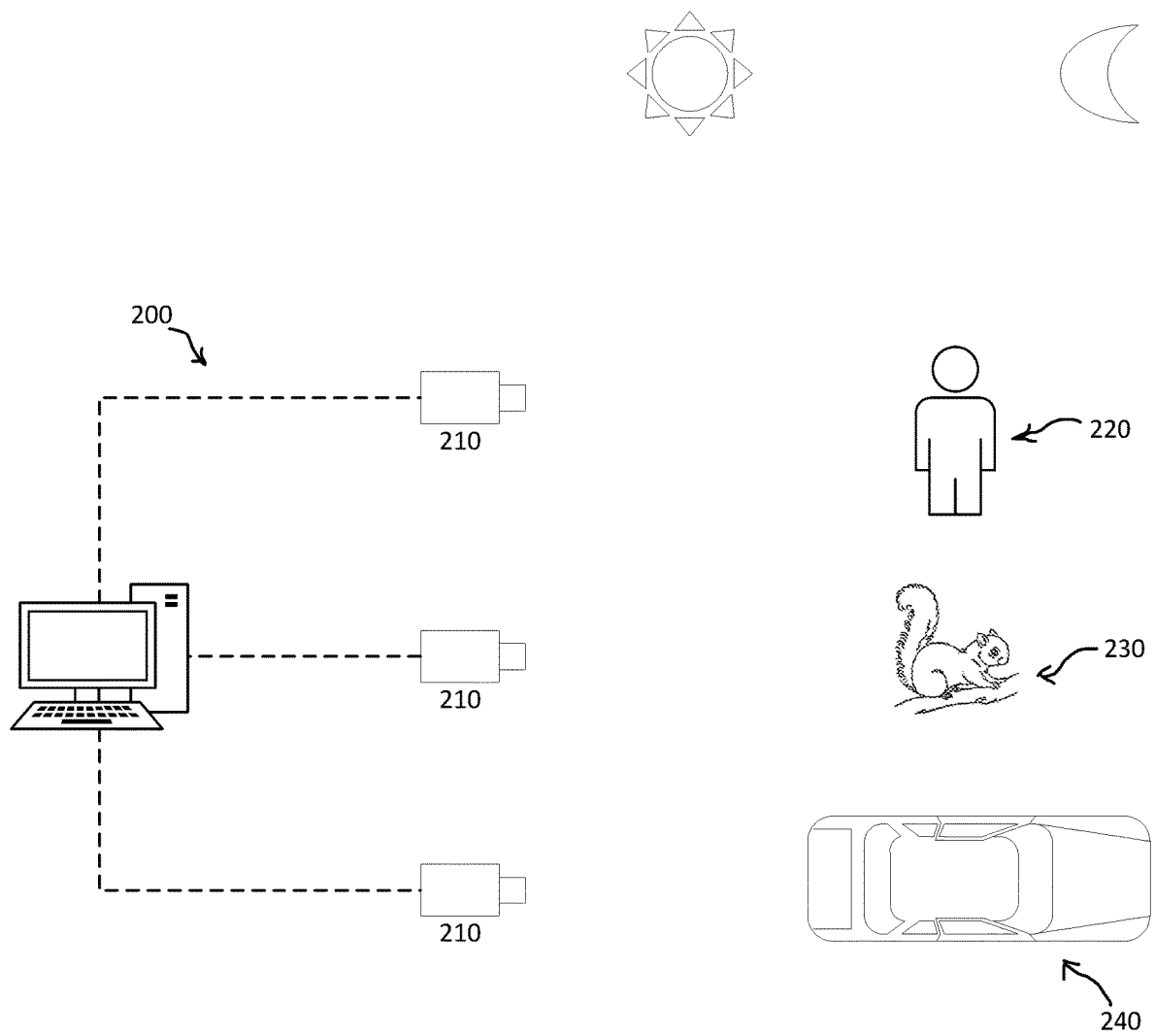
FIG. 2 is a schematic view of an exemplary AI system operating one or more cameras according to an embodiment of the present invention.

The platform can monitor agent efficiency by analyzing the time each agent takes to complete a task. Algorithms can search for irregularities such as agents taking too long or responding too quickly. Confidence in the AI system's decision to issue an alert to security personnel can be updated in real time based on prior outcomes such as whether a security threat was real and whether the threat was sufficiently severe to warrant a response. Similarly, measuring the degree of accuracy in identifying objects based on agent feedback enables the system to reach accurate, real time decisions and to reduce or eliminate false-negative or false-positive results, FIG. 2 illustrates an exemplary AI computing system 200 with wireless cameras 210. The system is configured to detect different types of objects using one or more wireless cameras based on latent characteristics, such as object behavior, movement, speed, location, size, direction, sounds, or other innate characteristics. Distinguishing between different objects is critical to the determination of issuing a security alert. For example, a squirrel in a tree 230 would not represent a security threat while a person 220 moving deliberately towards a door after dark may pose a threat. Similarly, a car 240 moving at a high rate of speed would pose more of a security threat than a person walking casually. The time of day (i.e., day or night) and crime statistics for the area are also factors taken into account by the AI system in determining whether to issue an alert to security personnel. A person delivering mail during the day would obviously not be treated the same as a person loitering at night.

The security alert issued by the AI system could be in the torn of an annotation displayed in a video frame, such as a message for a security guard. However, the annotation is not limited to text messages appearing in the video frame and may also include graphics, symbols, audio alarms, flashing lights, etc. The security agent's response to the alarm can then be monitored and recorded for subsequent feedback to the AI system so that the A system can evaluate whether the alarm was appropriate and whether the agent responded appropriately to the annotation(s). The agent's specific responses can further be used to adjust, modify, add, or delete variables and parameters for issuing alerts. For example, if the agent inspects the video frame and ignores the alert it could mean that the object was not really a threat. In this case, the AI system may need to adjust the variables used to determine if the object represents a threat or not.

Figure 3:
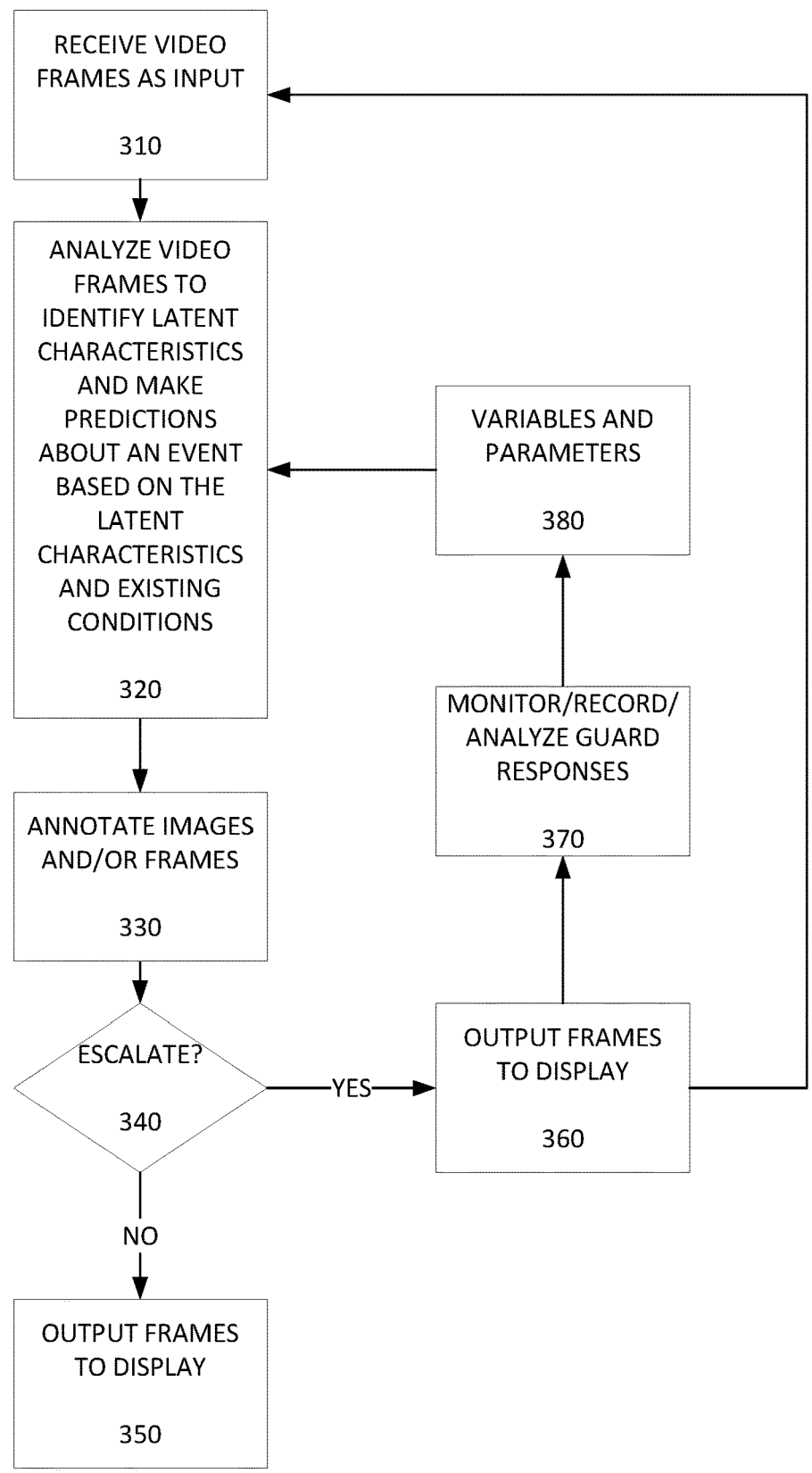
FIG. 3 is a flow chart of a process used by an exemplary AI system according to an embodiment of the present invention.

Turning to FIG. 3, a process is disclosed for using the AI system to make predictions about events captured by a video camera, determine whether to escalate the event by sending an alert to a security agent, and in the event of escalation, monitor and record the security agent's response(s) to the alert. The security agent's responses are then analyzed for the purpose of adjusting the variables and parameters used to define latent characteristics to be detected and make predictions about events based on the detected latent characteristics, as well as the annotations inserted into the frames. For example, if the agent responds by activating another alarm calling for support, this action reinforces the AI system's search for and use of a particular set of latent characteristic to arrive at the decision to escalate. On the other hand, if the agent activates an intercom, speaks to the suspect, and allows the suspect to enter, such actions may suggest that escalation was unwarranted. In addition, the variables and parameters used to classify the event as a threatening event could be adjusted so that a similar event in the future would not be classified as threatening and would not be escalated in the future.

At 310 the processor receives video frames as input. At 320, the processor analyzes the video frames to identify latent characteristics and make predictions about an event captured in the video based on the latent characteristics and existing conditions surrounding the event. At 330, the processor annotates images and/or frames and at 340 decides whether to escalate (i.e., issue a security alert) to a user such as a security guard. If there is no escalation 350, the frames (either annotated or unannotated) are output to a display. However, if the processor escalates based on the detected latent characteristics, the annotated frames are output to a security guard's display at 360. One of ordinary skill in the art will recognize that a security guard's display can be any type of display such as a monitor, touchscreen, laptop display, smart phone display, tablet display, smart watch display, virtual reality or augmented reality headset display, holographic display, etc.

At 370, the processor monitors or observes, records, and analyzes guard responses to the security alert by using one or more cameras, keystroke loggers, bodycams, GPS, motion tracking devices, sound recorders, or other devices. Analyzing guard responses may include analyzing the guard's emails, texts, or voice communications, whether an alarm was activated, security measures taken, whether backup support was requested, or any other type of activity performed by the guard. At 380, the processor updates variables and parameters that define the latent characteristics. The processor then searches for updated latent characteristics at 320, which may be different than the previous set of latent characteristics, based on guard responses. For example, improper or ineffective guard responses may lead to an updated set of parameters being utilized by the processor to identify different latent characteristics.

Parameters and variables that lead to accurate event classification can also be used to search video data to identify similar events that were previously captured by a camera. In this way, the AI system can identify prior incidents that occurred at the location or at any other monitored location and review the details of these events for the purpose of conducting a security assessment of the location. A large number of similar events (e.g., a number of threating events above a certain threshold) might necessitate stronger security measures at the location in question. Furthermore, the variables and parameters of different types of threatening or high-risk events, confirmed as such through agent response(s) and/or agent feedback, can be used to search past videos for similar types of events to gain comprehensive assessment of the different security risks that exist at a monitored location.

Turning to FIGS. 4A-4D, a database table of possible conditions and associated responses to those conditions by the AI system are illustrated. FIG. 4A depicts exemplary responses to different objects of interest under normal or average light conditions for an exemplary powered POE (Power Over Ethernet) or powered wireless camera. To be more specific, the table shows responses based on a type of object, its location and predicted path, and its behavior. Column one of table 400 indicates a type of object of interest, such as a person, car, animal, or other object. Column two relates to the objects (i.e., person, car, animal, or other object) inside a protection zone performing "suspect" behavior. The first cell in column two represents a situation in which a person is inside the protection zone engaging in suspect behavior. In this situation, the camera is programmed to "escalate now" by, for example, issuing an alert to security personnel. The second cell in column two represents a situation in which a car is inside the protection zone engaging in suspect behavior. In this situation, the camera is programmed to "hold for X seconds" or remain in the current recording position for X number of seconds where X is a predetermined value such as 30 seconds. The term "hold" as it relates to the camera can also refer to continuing to observe the object, in this case the car, for X amount of time. The third cell in column two represents a situation in which an animal is inside the protection zone engaging in suspect behavior. In this situation, the camera is also programmed to hold for X seconds or remain in the current recording position for 30 seconds. The fourth cell in column two represents a situation in which any other type of object is observed inside the protection zone. In this situation, the camera is programmed to observe the object for "MIN" amount of time such as 10 seconds. The database table 400 is thus used by the processor to map out camera responses to different scenarios.

Column three of table 400 relates to objects outside the protection zone, which are predicted to enter the protection zone based on their approach vector. The first cell in column three represents a situation in which a person is predicted to enter the protection zone. In this situation, the camera is programmed to "hold indefinitely" or continuously observe the person until the person moves outside the camera's field of view. As mentioned above, the term "hold" can also refer to the camera holding its position until directed elsewhere. The second cell in column three represents a situation in which a car is predicted to enter the protection zone. In this situation, the camera is programmed to "hold for X seconds" or observe the car for a predetermined amount of time such as 30 seconds. The third cell in column three represents a situation in which an animal is predicted to enter the protection zone. In this situation, the camera is programmed to observe the animal for a "MIN" or minimum amount of time, such as 10 seconds. The fourth cell in column three represents a situation in which another object is observed outside the protection zone but is predicted to enter the protection zone. In this situation, the camera is also programmed to observe the object for a MIN amount of time. A person of ordinary skill in the art will recognize that variables X and MIN can be set to different times besides 30 seconds and 10 seconds, respectively, but experience has demonstrated that 30 seconds is sufficient to observe an intent to engage in threatening or unsafe activity in the situations described above where X seconds of observation time are indicated, and 10 seconds is sufficient to observe such intent in the situations described above where MIN seconds of observation time are indicated.

Column four of table 400 relates to objects outside the protection zone that are not predicted to enter the protection zone. The first cell of column four represents a situation in which a person is observed outside the protection zone. In this situation, the camera is programmed to "hold for MIN seconds after last seen" or continue to try to observe the person for a time such as 10 seconds from when the person is last seen. In other words, when the camera can no longer observe the person because the person has left the field of view, the camera will continue to observe the area where the person was last seen for a period of 10 seconds. The second cell of column four represents a situation in which a car is observed outside the protection zone. In this situation, the camera is also programmed to hold for MIN seconds after last seen as described above. The third cell of column four represents a situation in which an animal is observed outside the protection zone. In this situation, the camera is programmed to hold or remain in the current recording position for MIN amount of time, such as 10 seconds. The fourth cell of column four represents a situation in which another object is observed outside the protection zone (i.e., another object besides a person, car, or animal). In this situation, the camera is also programmed to hold or remain in the current recording position for MIN amount of time, such as 10 seconds.

FIG. 4B depicts exemplary responses to different objects of interest under higher risk conditions, such as low light conditions or high-crime areas, for an exemplary powered POE (Power Over Ethernet) or powered wireless camera and is configured for a more aggressive response based on these higher risk conditions. The table 402 in FIG. 4B depicts responses based on a type of object, its location and predicted path, and its behavior. Column one of table 402 shows a type of object of interest, such as a person, car, animal or other object. Column two of the matrix relates to objects such as a person, car, animal or other object inside a protection zone performing "suspect" behavior. The first cell in column two represents a situation in which a person is inside the protection zone engaging in suspect behavior. In this situation, the camera is programmed to "escalate now" by, for example, issuing an alert to security personnel. The second cell in column two represents a situation in which a car is inside the protection zone engaging in suspect behavior. In this situation, the camera is programmed to "hold indefinitely" or remain in the current recording position until redirected by a user. The term "hold" as it relates to the camera can also refer to continuously observing the object, in this case the car, until the object disappears from the field of view. The third cell in column two represents a situation in which an animal is inside the protection zone engaging in suspect behavior. In this situation, the camera is also programmed to hold for X seconds or remain in the current recording position for 60 seconds. The fourth cell in column two represents a situation in which any other type of object is observed inside the protection zone. In this situation, the camera is programmed to observe the object for "MIN" amount of time such as 15 seconds. The database table 402 is thus used by the processor to map out camera responses to different scenarios.

Column three of table 402 relates to objects outside the protection zone, which are predicted to enter the protection zone based on their approach vector. The first cell in column three represents a situation in which a person is predicted to enter the protection zone. In this situation, the camera is programmed to "escalate now" or issue an alert. The second cell in column three represents a situation in which a car is predicted to enter the protection zone. In this situation, the camera is programmed to "hold indefinitely" or continuously observe the car until it disappears from the field of view. As mentioned above, the term "hold" can also refer to the camera holding its position until directed elsewhere. The third cell in column three represents a situation in which an animal is predicted to enter the protection zone. In this situation, the camera is programmed to observe the animal for "MIN" or minimum amount of time, such as 15 seconds. The fourth cell in column three represents a situation in which another object is observed outside the protection zone but is predicted to enter the protection zone. In this situation, the camera is also programmed to observe the object for MIN amount of time. A person of ordinary skill in the art will recognize that variables X and MIN can be set to different times besides 60 seconds and 15 seconds, respectively, but experience has demonstrated that 60 seconds is sufficient to observe an intent to engage in threatening or unsafe activity in the situations described above where X seconds of observation time are indicated, and 15 seconds is sufficient to observe such intent in the situations described above where MIN seconds of observation time are indicated.

Column four of database table 402 relates to objects outside the protection zone that are not predicted to enter the protection zone. The first cell of column four represents a situation in which a person is observed outside the protection zone. In this situation, the camera is programmed to "hold for MIN seconds after last seen" or continue to try to observe the person for a time such as 15 seconds from when the person is last seen. In other words, when the camera can no longer observe the person because the person has left the field of view, the camera will continue to observe the area where the person was last seen for a period of 15 seconds. The second cell of column four represents a situation in which a car is observed outside the protection zone. In this situation, the camera is also programmed to hold for MIN seconds after last seen as described above. The third cell of column four represents a situation in which an animal is observed outside the protection zone. In this situation, the camera is programmed to hold or remain in the current recording position for MIN amount of time, such as 15 seconds. The fourth cell of column four represents a situation in which another object is observed outside the protection zone (i.e., another object besides a person, car, or animal). In this situation, the camera is also programmed to hold or remain in the current recording position for MIN amount of time, such as 15 seconds.

FIG. 4C depicts exemplary responses to different objects of interest under normal risk conditions, such as a relatively safe area during daylight hours, for an exemplary battery powered wireless camera. Just as in FIGS. 4A-B, the database table 404 in FIG. 4C depicts responses based on a type of object, its location and predicted path, and its behavior. However, the responses are more intended to conserve battery power than the responses depicted in FIGS. 4A-B. Column two of the matrix relates to objects such as a person, car, animal or other object inside a protection zone performing "suspect" behavior. The first cell in column two represents a situation in which a person is inside the protection zone engaging in suspect behavior. In this situation, the camera is programmed to "escalate now" by, for example, issuing an alert to security personnel. The second cell in column two represents a situation in which a car is inside the protection zone engaging in suspect behavior. In this situation, the camera is programmed to "hold for X seconds" or remain in the current recording position for a time such as 15 seconds. The term "hold" as it relates to the camera can also refer to continuously observing the object, in this case the car, until the object disappears from the field of view. The third cell in column two represents a situation in which an animal is inside the protection zone engaging in suspect behavior. In this situation, the camera is programmed to observe the object for "MIN" amount of time such as 5 seconds. The fourth cell in column two represents a situation in which any other type of object is observed inside the protection zone. In this situation, the camera is programmed to observe the object for "MIN" amount of time such as 5 seconds.

Column three of table 404 relates to objects outside the protection zone, which are predicted to enter the protection zone based on their approach vector. The first cell in column three represents a situation in which a person is predicted to enter the protection zone. In this situation, the camera is programmed to "hold for 2X seconds" where X is for example 15 seconds and 2X is therefore 30 seconds. The second cell in column three represents a situation in which a car is predicted to enter the protection zone. In this situation, the camera is programmed to "hold for X seconds" such as 15 seconds. As mentioned above, the term "hold" can also refer to the camera holding its position until directed elsewhere. The third cell in column three represents a situation in which an animal is predicted to enter the protection zone. In this situation, the camera is programmed to observe the animal for "MIN" amount of time, such as 5 seconds. The fourth cell in column three represents a situation in which another object is observed outside the protection zone but is predicted to enter the protection zone. In this situation, the camera is also programmed to observe the object for MIN amount of time. A person of ordinary skill in the art will recognize that variables X and MIN can be set to different times besides 15 seconds and 5 seconds, respectively.

Column four of table 404 relates to objects outside the protection zone that are not predicted to enter the protection zone. The first cell of column four represents a situation in which a person is observed outside the protection zone. In this situation, the camera is programmed to "hold for MIN seconds after last seen" or continue to try to observe the person for a time such as 5 seconds from when the person is last seen. In other words, when the camera can no longer observe the person because the person has left the field of view, the camera will continue to observe the area where the person was last seen for a period of 5 seconds. The second cell of column four represents a situation in which a car is observed outside the protection zone. In this situation, the camera is programmed to "hold for MIN seconds after last seen up to X seconds total" or continue to try to observe the person for a time such as 5 seconds from when the person is last seen up to 15 seconds. In other words, when the camera can no longer observe the person because the person has left the field of view, the camera will continue to observe the area where the person was last seen for a period of 5-15 seconds. The third cell of column four represents a situation in which an animal is observed outside the protection zone. In this situation, the camera is programmed to hold or remain in the current recording position for MIN amount of time, such as 5 seconds. The fourth cell of column four represents a situation in which another object is observed outside the protection zone (i.e., another object besides a person, car, or animal). In this situation, the camera is also programmed to hold or remain in the current recording position for MIN amount of time, such as 5 seconds.

Unlike the matrix in FIG. 4C, the database table in FIG. 4D depicts exemplary responses to different objects of interest under high-risk conditions, such as a high crime area and/or low light conditions, for an exemplary battery powered wireless camera. Also, similar to FIGS. 4A-B, the table 406 in FIG. 4D depicts responses based on a type of object, its location and predicted path, and its behavior, but the responses are more intended to conserve battery power than the responses depicted in FIGS. 4A-B. Column two of table 406 relates to objects such as a person, car, animal or other object inside a protection zone performing "suspect" behavior. The first cell in column two represents a situation in which a person is inside the protection zone engaging in suspect behavior. In this situation, the camera is programmed to "escalate now" by, for example, issuing an alert to security personnel. The second cell in column two represents a situation in which a car is inside the protection zone engaging in suspect behavior. In this situation, the camera is programmed to "hold indefinitely" or remain in the current recording position until redirected by a user. The term "hold" as it relates to the camera can also refer to continuously observing the object, in this case the car, until the object disappears from the field of view. The third cell in column two represents a situation in which an animal is inside the protection zone engaging in suspect behavior. In this situation, the camera is programmed to observe the object for X amount of time such as 30 seconds. The fourth cell in column two represents a situation in which any other type of object is observed inside the protection zone. In this situation, the camera is programmed to observe the object for a "MIN" amount of time such as 10 seconds.

Column three of database table 406 relates to objects outside the protection zone, which are predicted to enter the protection zone based on their approach vector. The first cell in column three represents a situation in which a person is predicted to enter the protection zone. In this situation, the camera is programmed to "escalate now" by, for example, issuing an alert to security personnel. The second cell in column three represents a situation in which a car is predicted to enter the protection zone. In this situation, the camera is programmed to "hold indefinitely" or continuously observe the car until it disappears from the field of view. As mentioned above, the term "hold" can also refer to the camera holding its position until directed elsewhere. The third cell in column three represents a situation in which an animal is predicted to enter the protection zone. In this situation, the camera is programmed to observe the animal for "MIN" amount of time, such as 10 seconds. The fourth cell in column three represents a situation in which another object is observed outside the protection zone but is predicted to enter the protection zone. In this situation, the camera is also programmed to observe the object for MIN amount of time. A person of ordinary skill in the art will recognize that variables X and MIN can be set to different times besides 30 seconds and 10 seconds, respectively.

Column four of database table 406 relates to objects outside the protection zone that are not predicted to enter the protection zone. The first cell of column four represents a situation in which a person is observed outside the protection zone. In this situation, the camera is programmed to "hold for MIN seconds after last seen" or continue to try to observe the person for a time such as 10 seconds from when the person is last seen. In other words, when the camera can no longer observe the person because the person has left the field of view, the camera will continue to observe the area where the person was last seen for a period of 10 seconds. The second cell of column four represents a situation in which a car is observed outside the protection zone. In this situation, the camera is programmed to "hold for MIN seconds after last seen up to X seconds total" or continue to try to observe the person for a time such as 10 seconds from when the person is last seen up to 30 seconds. In other words, when the camera can no longer observe the person because the person has left the field of view, the camera will continue to observe the area where the person was last seen for a period of 10-30 seconds. The third cell of column four represents a situation in which an animal is observed outside the protection zone. In this situation, the camera is programmed to hold or remain in the current recording position for MIN amount of time, such as 10 seconds. The fourth cell of column four represents a situation in which another object is observed outside the protection zone (i.e., another object besides a person, car, or animal). In this situation, the camera is also programmed to hold or remain in the current recording position for MIN amount of time, such as 10 seconds.

Figure 5:
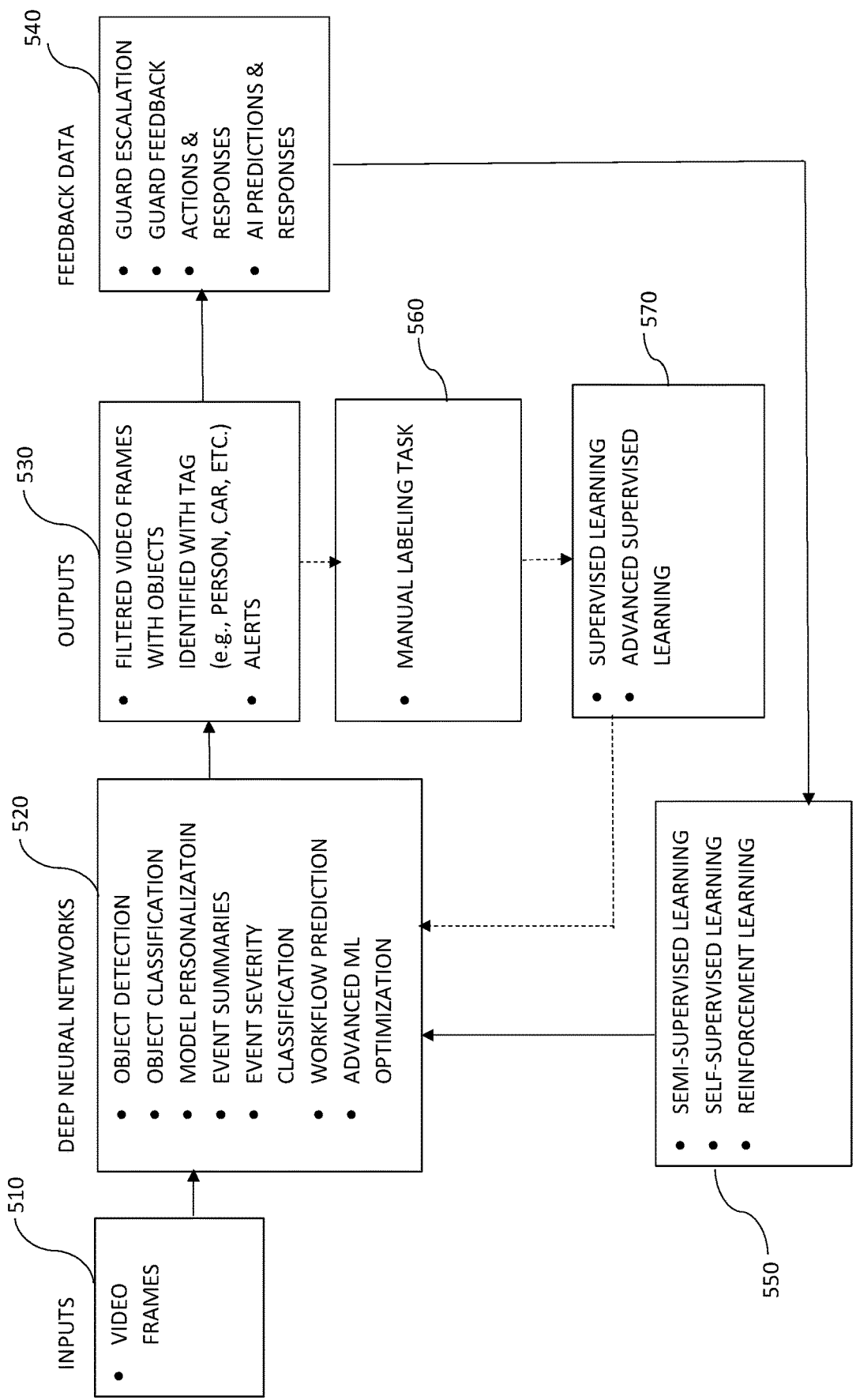
FIG. 5 is a schematic view of a system according to an embodiment of the present invention.

FIG. 5 illustrates an embodiment of a data and process flow diagram for a deep learning AI system as described herein. During the input phase 510, a processor is configured to accept video frames as input. In the neural network phase 520 the processor is further configured to detect objects in the video frame and identify the objects using, for example, the object's movements and/or behavior. Such movements and/or behavior can be described as latent characteristics of the object, as opposed to a person reviewing video frames and explicitly applying a descriptor to each object during the annotation process, or using physical characteristics to classify objects using, for example, a classification database. This identification technique (i.e., using latent characteristics such as behavior) is much more efficient in that it avoids having to use more traditional high-overhead approaches such as comparator algorithms or having a person review every frame for the purpose of identifying each object in the frame. The system's use of latent characteristics of the object can also be improved upon over time using human feedback received through, for example, graphical user interface 104.

Other characteristics may also be used to identify the object, such as the object's size, shape, dimensions, speed, color, location, and sounds. In addition, confidence scores can be applied to each identification of an object using the object's latent or inherent characteristics based on historical data (i.e., previously successful identifications). For example, if particular movement or behavior previously yielded an accurate identification, a future display of such movement/behavior can be used with a high degree of confidence to identify the object. In contrast, behavior and movement that yielded an inaccurate identification can be avoided in the future. The system is thus able to improve its identification of objects over time and can use these same techniques to determine if the object represents a threat.

The processor is further configured to classify events based on the type of object, object movement, object direction, and other conditions such as time of day or night, and crime statistics for the area. The processor may be further configured to classify events on a severity scale from least severe to most severe based on the aforementioned exemplary factors. The processor may also be configured to classify events based on the type of object identified using, for example, the latent characteristics described above, and its associated behavior and/or movement. The object's size, shape, dimensions, speed, color, location, and sounds can also be used to help classify the event. For example, the processor can determine that the object is an animal that poses no threat if the object is small and climbing up a tree in the day. On the other hand, the processor may classify the event as a threat warranting escalation to a security guard if the object is large, moving deliberately towards a door, is carrying an object, and the time is 2:00 am.

The processor is further configured to generate a workflow prediction based on the event so that security personnel can be directed to respond to the event in the most appropriate manner. Machine learning (ML) optimization is achieved by evaluating responses to events and receiving feedback from security guards to help improve the security camera alert system. A successful outcome such as an alert that results in an appropriate response that de-escalates or neutralizes a threat is reinforced, while alerts that prove to be a waste of time, or ineffective and inappropriate responses by security personnel lead to automatic adjustments by the security camera alert system. For example, the processor may be configured to avoid issuing an alert for certain events that proved to be a waste of time. Similarly, the processor may be configured to issue a different set of instructions to security personnel if a previous set proved ineffective or inappropriate.

The output phase 530 illustrates exemplary outputs such as filtered video footage with tags identifying objects in the video such as people, cars, animals, etc., and provides text and/or graphical alerts to security personnel such as the nature of the alert and how to respond to the alert. The processor is configured to determine whether an event is severe enough to warrant an alert or "guard escalation" based on for example an event severity classification.

In the feedback phase 540, security guard responses to alerts are evaluated and feedback from the guards is collected. The effectiveness of the guard responses to the alerts determines whether certain events are de-escalated so that no future alerts are issued or if events that were previously not escalated should generate an alert. Furthermore, the type of annotations that are associated with certain events can be modified to improve the system. Annotations can be text, indicators, flags or graphics that are inserted into the filtered video frames to help direct or instruct security guards how to respond to an alert. Annotations can also include information that describes objects in the video, regardless of whether an alert is issued, to help the guard quickly identify the object even if picture quality is poor due to a decrease in signal-to-noise ratio.

The dashed path which includes phase 560 and 570 represents the traditional machine learning approach, the state of the art prior to this invention. It is a less efficient approach in which objects in video frames are manually labeled by humans instead of relying on implicit guard feedback and or other latent feedback to create or adjust the latent characteristics or the resulting object detection, identification, classification and event summary, event prediction, event severity classification, model personalization process in phase 520. Supervised learning or advanced supervised learning may be applied to labeled data points (e.g., objects or events) for the purpose of creating or changing one or more aspects of phase 520.

With unsupervised learning, object features can be ascertained from object data in the image frames by detecting patterns or properties of the data. Deep neural networks (DNNs) can be utilized for this purpose which use analytical tools such as regression or other statistical techniques to analyze image or object data for features. These techniques can be refined until desired outputs are achieved using backpropagation. For example, if the algorithm knows the features of the object data ahead of time, it can formulate techniques for detecting those features until it consistently and reliably ascertains the object features. In many cases, object labels are not known ahead of time so unsupervised learning algorithms can be very useful in detecting object features without being able to identify objects from object labels. Some unsupervised learning algorithms that can be used by the system to ascertain object features may include t-distributed stochastic neighbor embedding (T-SNE), K-Means Clustering, Transfer Learning, and K-Nearest Neighbors. One of ordinary skill in the art will appreciate that there are other unsupervised learning algorithms that may be employed by the system described herein, as this is not an exhaustive list.

Semi-supervised learning is a class of supervised learning tasks and techniques that also makes use of unlabeled data for training—typically a small amount of labeled data with a large amount of unlabeled data. Semi-supervised learning falls between unsupervised learning and supervised learning. The labeled data can then be used to train the algorithm to detect objects or features in the unlabeled data. For example, image data for features that are labeled can be used to teach the algorithm to identify features from unlabeled data.

Other types of ML can include self-supervised learning in which the system processors are configured to predict unobserved or hidden part of the input. For example, missing parts of an image captured by a camera can be predicted using the remaining parts of the image. A self-supervised learning system aims at creating a data-efficient artificial intelligent system. It is generally referred to as extension or even improvement over unsupervised learning methods. However, as opposed to unsupervised learning, self-supervised learning does not focus on clustering and grouping.

Yet another type of ML is reinforcement learning that uses reward and punishment to achieve a desired goal or outcome. The system of the present invention can use a reinforcement learning algorithm to achieve accurate feature or object detection through trial and error where success is rewarded, and failure is penalized. With increased processing power, the system can generate a multitude of scenarios and learn to recognize objects or features based by evaluating angles, shapes, size, speed, location, sound, direction, or any other aspect associated with the object.

The machine learning phase 550 utilized by the system of this invention may encompass one or more of these different types of machine learning (ML) algorithms to help improve the security camera alert system. As discussed, these can include semi-supervised learning in which a user provides some inputted guidance on how the system should respond to future events. Other types of ML can include self-supervised learning in which the system processors are configured to autonomously evaluate responses to events based on video and/or audio captured during a security shift (e.g., a set period of time). In this situation, the system itself determines whether the response captured on video and/or audio was effective and appropriate. The system also determines whether future events warrant an alert based on whether the alert proved to be justified or a waste of time. A "reinforcement learning" algorithm can be used wherein justifiable security alerts are reinforced and alerts generated from "false positives" are discouraged or penalized. For example, an annotated security alert that results in a successful security response by security personnel may be elevated to a higher score on an effectiveness scale (e.g., closer to "most effective"), while an annotated alert that results in an unsuccessful or inappropriate security response may be reduced to a lower score on the effectiveness scale (e.g., closer to "least effective"). In some cases, certain annotated alerts may be eliminated altogether based on a low score, and annotated alerts with a high effectiveness score will be repeated for an associated event. Similarly, alerts that prove to be justified for an associated event can be elevated to a higher priority score so that the alert is more likely to be issued for the event in question, while alerts that proved to be unjustified can be reduced to a lower priority score so the alert is less likely to be issued for the event in question. The camera described herein may be similar to the machine learning and object detection camera described in U.S. Pat. Pub. No. US 2019/0311201 to Selinger et al., the contents of which are incorporated herein by reference in their entirety.

By capturing click and behavior data from security guards, the system can improve existing models for activating a security alert using guard feedback or tracked guard responses (e.g., whether the guard escalated the event; whether the guard clicked through video frames; which video frames were inspected) to help define latent variables in supervised models and fine-tune the parameters for event classification. The system can also create new models using a closed loop semi-supervised approach. For example, the system can create new models that actually identify latent properties (i.e., the bounding box) without every providing a bounding box.

The system may be configured to capture guard responses to a video of an event presented through, for example, keystroke capture, audio capture from a microphone, video of guard behavior including body cams, or input from any other input device. Some exemplary responses may include how long the guard spent viewing a video; whether the guard investigated further after viewing the video; whether the guard requested additional information about the property being protected by the surveillance system; whether the guard requested additional information from other cameras; whether the guard requested additional information about a camera's video history; whether the guard requested information about the residents of the property; whether the guard clicked on an intervention button to alert other security personnel; whether the guard activated an alarm; whether the guard sent a package-delivery notification to the end user; whether the guard called the police; whether the guard called the end user; whether the guard hovered their mouse over the video; whether the guard filed a customer care ticket against the currently viewed video; and whether the guard responded to a customer request.

These exemplary captured responses may be used to train a model, with the guard response as the "dependent variable" and the videos as the "independent variable." This differs from traditional supervised video learning in that traditionally, AI companies are trying to learn a "Label" that is applied after the fact, e.g., "this is a dog", "this is a hot dog", "this is a person." Instead, the system generates hidden or "latent" variables that may represent those objects and the system learns from the implicit behavior, not from explicit labels. In other words, the object's behavior and movement is used to define the object dynamically as opposed to using an object classification database or other explicit identification system.

The approach of using captured responses has a number of advantages over using a traditional labeled dataset. First, developing a database or other explicit identification system is costly. Each label must be created by a human being, which takes significant time and money. Secondly humans are error prone, and so therefore each label must then also be verified by one or more human beings, further increasing costs. Third, these costs limit the volume of data that can be used: Even a company that collects billions of data points can only use the few thousand or tens of thousands of data points that have been human labeled for developing their algorithms. Finally, the intervention and actions by an explicit label takes time meaning that such a system cannot react immediately to changes in the environment.

A system that uses captured responses can address each of these problems by its very nature. There are no additional costs for human labor as the data used for training are captured from a fundamental business process that is pre-existing. This reduction in labor also means that the extra costs are not incurred. Importantly, this also means that 100% of the captured data can be used—not just the data that has been manually labeled. In many real-world examples, this will increase the amount of data used for a learning system by 10,000× or more. Research has established that the volume of data correlates strongly with the strength of the predictive model making this a significant advantage. Ultimately, this data might be used in real time, bypassing any delay in processing allowing the system to respond in real time to any changes in the environment.

Once a trained label is created, the system can generate a "query model" that can be used in a semi-supervised learning manner to find other similar events/videos from video history. A model can be trained using "package delivery" as the result from the guard. The system can then create an initial model that is trained on this result and use it to query billions of other images in the past.

The system can then find other similar images that will be the most useful in helping train another model and restrict these. This is a type of bootstrapping; but instead of bootstrapping using explicit labels, the system uses implicit data. Once this query model has retrieved enough data across the network, the system uses offline learning models to use AI to create training data for another network.

A key piece of missing data when creating object models is "localization data" (e.g., bounding boxes showing the location and size of an object). These data can be approximately generated over a massive data set using the approach above: query the whole massive dataset identifying likely "packages"; then use an offline technique to estimate where the localization information might be; train another query model using this data (where the data themselves have been wholly generated by an AI technique) to train another model.

Because some artificial intelligence systems can be continually trained, their performance can improve over time. Thus, the current subject matter can route tasks based on machine performance, which can be represented by a confidence metric produced by the AI system. As the artificial intelligence component is trained on more real-world data, the artificial intelligence component becomes more accurate and less agent input is required. Thus, the relative processing burdens between the artificial intelligence component and the human intelligence component is dynamic and can vary over time.

Although various embodiments have been described with reference to the Figures, other embodiments are possible. For example, in some embodiments, battery powered cameras may be managed with artificial intelligence configured in a local hub to intelligently manage camera power consumption. In some scenarios of exemplary usage, battery powered security cameras may provide a multitude of benefits to users including ease of setup and ease of distribution. In various examples of use, battery powered security cameras are a popular way to provide visibility around a home. In an illustrative example, a camera if connected to an intelligent WiFi hub may manage the power consumption with a higher degree of accuracy than a camera without AI, or a camera running AI on the camera, or a camera running AI in the cloud.

In some embodiments, a set of cameras (and potentially other sensors) may be connected to an intelligent WiFi hub. In various implementations, machine learning may be performed on this hub which in some designs may be both the network connectivity hub of the camera and a processor designed to perform AI. In an illustrative example, the hub may be designed to have sufficient computational power (including a GPU) to perform the AI with very low latency (<0.1 s) so that every frame can be evaluated for its potential security concern. In an illustrative example of exemplary usage, such low-latency AI evaluation of potential security concern may allow a very precise management of power. For example, the low-latency AI may determine that it is only a cat entering the area of interest, and that there are no people within the frame, so to disregard this particular event.

In an illustrative scenario exemplary of prior art usage without AI, battery life may be very short—for example the Netgear Arlo Pro has a very short battery life (<10 days in areas of lots of motion). In some exemplary prior art scenarios, AI on cameras (such as cameras plugged into a wall) may consume excessive power. For example, running a simple AI filter on a battery-powered camera would more than double (or more likely 10×) the power consumption of the camera-having a direct and proportional impact on its battery life. In an illustrative example, cloud-based AI may be both too slow and too expensive to perform real-time analysis for all motion events for a battery powered camera (each frame must be analyzed in real-time [<100 ms] to determine if the camera should stay on). In some embodiments, AI may be configured to identify relevant objects within the field of view of battery powered cameras. In various implementations, every frame may be economically analyzed for interesting things in the field of a camera. In some exemplary scenarios of use, analyzing every frame in the cloud for interesting things in the field of a camera may be prohibitively expensive for most consumers.

In some exemplary usage scenarios of various embodiments, irrelevant events may be quickly and intelligently filtered if they do not contain objects of interest as identified by an AI (e.g., identify people, dogs, etc.); or identify the specific residents of a home, further reducing power consumption based on management of the camera's power and filtering events and notifications based on the identification by the AI. In some embodiments, the AI may be customized to an individual home or other facility while protecting privacy. In various implementations, an embodiment distributed AI may be customized to recognize the residents of a particular home or employees of a business without ever sharing the images of these people to the cloud, based on, for example, methods for distributed training of artificial intelligence to recognize objects in video while protecting privacy as described with reference to FIGS. 1-6 of U.S. patent application Ser. No. 15/491,950, entitled "Distributed Deep Learning Using a Distributed Deep Neural Network," filed by Selinger, David Lee, et al., on Apr. 19, 2017 the entire contents of which are herein incorporated by reference. In some designs, battery-powered cameras may be configured to run object tracking on the camera. In some examples, an object to be tracked may be configured in the camera by the network hub. In some examples, object tracking on the camera may result in increased camera energy efficiency as a result of sending only events related to objects of interest to the network hub from the camera. Various implementations may be useful in home security or facility security to protect the perimeter of the home or facility.

In some embodiments, event filtering conditions may be determined as a function of the type of an identified or tracked object. In some examples, the type of object may be determined by artificial intelligence configured in a network hub based on video frames or images received by the hub from a camera. In an illustrative example of exemplary usage, prior art cameras may turn on for a fixed period of time under two filtering conditions: 1. Motion detector activation for a period of time or with a certain first derivative; and, 2. Motion in area-of-interest of camera. In some embodiments, a real time AI as described with reference to FIGS. 1-4 of U.S. patent application Ser. No. 15/492,011, entitled "System and Method for Event Detection Based on Video Frame Delta Information in Compressed Video Streams," filed by Selinger, David Lee, et al., on Apr. 20, 2017 the entire contents of which are herein incorporated by reference, may be configured to quickly determine the type of a moving object. In an illustrative example, object type may be "cat", "dog", or "son". Such exemplary real-time moving object type determination may create various benefits. For example, in some embodiments, in response to type of object detected by AI in the hub, the system may cut-short the camera fixed on-time, saving battery. In some designs, object type information may also be used to filter notifications to the owner.

In various embodiments, ambient or environmental conditions such as illumination may be adapted in real-time based on evaluation of image quality, to improve detection capability based on improvement in image quality. In exemplary scenarios of prior art use, some current cameras may set the illumination level according to an ambient light sensor. In some embodiments illumination may be changed in real-time based on evaluation of image quality metrics. For example, in some embodiments, illumination may be increased or decreased in real-time as a function of type of object information.

In some embodiments, bitrate may be adapted in real-time based on evaluation of image quality, to improve detection capability based on improvement in image quality. In exemplary scenarios of prior art use, some current cameras may set the bitrate level according to the codec or video profile information. In some embodiments bitrate may be changed in real-time based on evaluation of image quality metrics. For example, in some embodiments, bitrate may be increased or decreased in real-time as a function of type of object information.

In various designs, AI for camera management at the hub may be cheaper than in the cloud. In some embodiments, AI for camera management at the hub may be faster than AI in the cloud. In an illustrative example of exemplary prior art usage, cloud services may not be optimized for real-time performance, as they do not run real-time operating systems (RTOS OR RTOSES). In some examples of the prior art, cloud services cannot be configured with RTOSES because they are virtualized. In an illustrative example of a virtualized cloud service, the OS inside the Virtual Machine (VM) calls to the underlying OS, which is never an RTOS because to be an RTOS would require one VM to be able to exclude other VMs from access to hardware, which is not now possible.

In various designs, such real-time AI-based camera management may advantageously provide the opportunity to control actuators or other outputs in real-time in response to events or objects detected by the AI in video or images received by the hub. For example, in some embodiments, actuators or other outputs controlled in real-time in response to events or objects detected by the AI in video or images received by the hub may include a pan-and-tilt following a burglar detected by the AI.

In some embodiments, filtering conditions may be changed in real time. In exemplary scenarios of usage, prior art cameras may not be able to change their filtering conditions in real-time. In some examples, prior art cameras may not, for example, adapt filtering conditions to ignore objects that are not of interest; the best they could conceivably do is to send the information to the web and be one (1) second behind real-time. In some embodiments, an exemplary AI-managed camera may detect that the object in the field of view is a cat and so for the next 10 minutes, we will not trigger on cat-sized objects.

In various exemplary scenarios of prior art usage, battery powered cameras are not configured with AI. In some exemplary scenarios of prior art usage, cameras configured with AI may typically have wired power. In some illustrative scenarios or prior art usage, excessive battery drain may result from running AI on a battery powered camera.

Some embodiments may include Artificial Intelligence (AI) configured in a network hub communicatively and operatively coupled with a wireless camera. In some designs, cameras communicatively and operatively coupled with the network hub may be Common Off The Shelf (COTS) cameras.

In some implementations, the network hub may include more than one network connection. In some embodiments, the network hub may include a Wi-Fi connection. In various designs, the network hub may include a wired power connection. In some examples, the network hub may include a wired connection to the network. In various designs, cameras may stream video frames or images to the hub. In various designs, more than one AI may be configured in the hub. In some examples, various AIs configured in the hub may be adapted to detect a diversity of various objects. In some examples, the hub may be configured to direct cameras, for example, a hub may be configured to control the position or orientation of a camera through pan, tilt, or zoom operations directed by the hub. In some designs, the hub may be configured to reboot or control cameras. In various implementations, the hub may be adapted to maintain the health of cameras; for example, the hub may be configured to send an alert if a camera goes offline, or predict when a camera battery will need to be replaced and send a battery change alert. In some examples, the hub may be configured to control a camera to focus on objects in the visual field of the camera. In exemplary scenarios of prior art usage, controlling a camera to focus on objects in the visual field of the camera cannot be done after the camera captures the images; for example, the hub may be configured to control camera focus, lighting, and bitrate changes, in response to image quality metrics evaluated by the AI configured in the hub. In some designs, the AI configured in the hub may determine specifics about object including identifying specific individuals. In some examples, the hub may be adapted with a High Dynamic Range (HDR) imaging feature usable in real time. For example, in illustrative examples of prior art usage, useful real-time HDR may not be possible due to latency in the cloud. In some embodiments, the real-time cloud latency limitation of the prior art failure to provide useful real-time HDR may be overcome as a result of providing a local hub adapted with an HDR feature. In some examples, camera video feeds may be 30 frame/sec, 60 frame/sec, or faster. Some embodiments may respond with useful object detection or AI predictions or decisions within one to two frames, based on deltas or differences between frames. In an exemplary scenario illustrative of the response time of cloud-based systems, prior art response times may be in the range of several seconds or longer. In some examples of illustrative usage scenarios, fast response times may be important for security purposes. Some embodiments may advantageously provide detection response times an order of magnitude faster and more accurate. In an illustrative example, if someone turns their head into a camera's visual field only for a quick moment, the event could be missed in the latency of cloud system, however an embodiment hub system would not lose the imagery. In various implementations, a hub system may identify specific objects, such as, for example, a specific cat, a specific dog, or a specific human. For example, an embodiment hub system may be fast and accurate enough to identify the difference between a homeowner's dog and a random dog. In some embodiments, the AI configured in the hub may be personalized for various places, for example, in a specific home, the AI may be configured to expect certain specific objects.

In an illustrative example according to an embodiment of the present invention, the system and method are accomplished through the use of one or more computing devices. As depicted in FIG. 1, one of ordinary skill in the art would appreciate that an exemplary network hub 105 appropriate for use with embodiments of the present application may generally be comprised of one or more of a Central processing Unit (CPU) which may be referred to as a processor, Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While some of the foregoing drawings and description set forth functional aspects of some embodiments of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, Python, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are exemplary, and provided for illustrative disclosure of enablement and exemplary best mode of various embodiments. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as described herein-above may be used. Many suitable materials are known and available and can be selected and mixed depending on desired strength and flexibility, preferred manufacturing method and particular use, as will be apparent to a person of ordinary skill in the art.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

The invention claimed is:

1. A system for training an AI model, the system comprising:
    a processor;
    at least one video camera in communication with the processor;
    a memory that stores computer readable instructions that, upon execution by the processor, cause the processor to:
        divide a recorded video into video frames;
        make a first prediction about an event based on the first set of latent characteristics, and existing conditions surrounding the event;
        identify a second set of latent characteristics in the video frames, the second set of latent characteristics being different from the first set of latent characteristics;
        make a second prediction about the event based on the second set of latent characteristics and the existing conditions surrounding the event;
        annotate one or more of the frames based on one of the first set of latent characteristics and the first prediction or the second set of latent characteristics and the second prediction;
        observe and track a user response of a first user to the one or more annotated frames;
        score how useful the first set of latent characteristics is in achieving a preferred user response based on the user response and the first prediction;
        score how useful the second set of latent characteristics is in achieving the preferred user response based on the user response and the second prediction;
        perform an adjustment to the first set of latent characteristics or the second set of latent characteristics based on one or more of the user response, a score of the first set of latent characteristics, or a score of the second set of latent characteristics;
        wherein semi-supervised learning or self-supervised learning is used to score the first set of latent characteristics and the second set of latent characteristics.

2. The system of claim 1, wherein adjusting the first set of latent characteristics or the second set of latent characteristics includes at least one of adding new latent characteristics, deleting a latent characteristic, and modifying a latent characteristic.

3. The system of claim 1, wherein the first set of latent characteristics or the second set of latent characteristics includes an object's movement, direction, behavior, size, shape, speed, color, and sound.

4. The system of claim 1, wherein the existing conditions include time of day, crime statistics, type of business protected, light conditions, geographic features, surrounding facilities, surrounding human activity, traffic conditions, weather conditions, and noise conditions.

5. The system of claim 1, wherein the annotations include a security alert to a security guard.

6. The system of claim 5, wherein the security guard's response to a security alert is tracked and used as feedback to improve at least one of: latent characteristic, object identification, event classification, or annotations.

7. The system of claim 1, wherein the processor is further configured to search video frames for latent characteristics that define an object.

8. The system of claim 1, wherein the processor is further configured to search video frames for latent characteristics that define an event.

9. The system of claim 6, wherein the processor generates a probability for each of one or more possible security guard actions in response to the security alert.

10. The system of claim 1, wherein semi-supervised learning, self-supervised learning, or reinforcement learning is used to generate or adjust latent variables that define a latent characteristic of the first set of latent characteristics or a latent characteristic of the second set of latent characteristics based on the user response without requiring any additional human intervention.

11. The system of claim 1, wherein the first set of latent characteristics and the second set of latent characteristics are identified in more than one frame.

12. The system of claim 1, wherein the first set of latent characteristics or the second set of latent characteristics are identified using a computing device at the same location the recorded video was recorded.

13. The system of claim 1, wherein the first set of latent characteristics or the second set of latent characteristics is adjusted in real-time after processing the observed user response.

14. The system of claim 1, wherein the adjustment to the first set of latent characteristics or the adjustment to the second set of latent characteristics is iteratively used in real-time to process a subsequent frame within minutes or seconds after the first set of latent characteristics or the second set of latent characteristics have been created or adjusted.

15. The system of claim 1, wherein the user is at the same location as the location where the video is generated.

16. The system of claim 1, wherein the user is at a different location from where the video is generated.

17. The system of claim 1, wherein the system gathers video inputs from numerous different source cameras and the first set of latent characteristics or the second set of latent characteristics identified by one source of cameras is used to improve the AI model for all other users.

18. The system of claim 1, wherein a multitude of AI models are generated and their effectiveness at making predictions are used to select the best AI model.

19. The system of claim 1, wherein a multitude of AI models are generated and their predictions are combined to generate a further result.

20. A method for training an AI model, the method comprising:
   dividing a recorded video into video frames;
   identifying a first set of latent characteristics in the video frames;
   making a first prediction about an event based on the first set of latent characteristics and existing conditions surrounding the event;
   identifying a second set of latent characteristics in the video frames, the second set of latent characteristics being different from the first set of latent characteristics;
   making a second prediction about the event based on the second set of latent characteristics and the existing conditions surrounding the event;
   annotating one or more of the frames based on one of the first set of latent characteristics and the first prediction or the second set of latent characteristics and the second prediction;
   tracking and observing a user response of a user to the one or more annotated frames;
   scoring how useful the first set of latent characteristics is in achieving a preferred user response based on the user response and the first prediction;
   scoring how useful the second set of latent characteristics is in achieving the preferred user response based on the user response and the second prediction;
   performing an adjustment to the first set of latent characteristics or the second set of latent characteristics based on one or more of the user response, a score of the first set of latent characteristics, or a score of the second set of latent characteristics;
   wherein semi-supervised learning or self-supervised learning is used to score the first set of latent characteristics and the second set of latent characteristics.

21. The method of claim 20, wherein adjusting the first set of latent characteristics or the second set of latent characteristics includes at least one of adding new latent characteristics, deleting a latent characteristic, and modifying a latent characteristic.

22. The method of claim 20, wherein the first set of latent characteristics or the second set of latent characteristics includes the object's movement, direction, behavior, size, shape, speed, color, and sound.

23. The method of claim 20, wherein the existing condition include time of day, crime statistics, type of business protected, light conditions, geographic features, surrounding facilities, surrounding human activity, traffic conditions, weather conditions, and noise conditions.

24. The method of claim 20, wherein the annotations include a security alert to a security guard.

25. The method of claim 24, wherein the security guard's response to a security alert are tracked and used as feedback to improve at least one of: latent characteristic, object identification, event classification, or annotations.

26. The method of claim 20, further comprising searching the video frames for latent characteristics that define an object.

27. The method of claim 20, further comprising searching the video frames for latent characteristics that define an event.

28. The method of claim 25, further comprising generating a probability for each of one or more possible security guard actions in response to the security alert.

29. The method of claim 20, wherein semi-supervised learning, self-supervised learning, or reinforcement learning is used to generate or adjust latent variables that define a latent characteristic of the first set of latent characteristics or a latent characteristic of the second set of latent characteristics based on the user response without requiring any additional human intervention.

30. The method of claim 20, wherein the first set of latent characteristics and the second set of latent characteristics are identified in more than one frame.

31. The method of claim 20, wherein the first set of latent characteristics or the second set of latent characteristics are identified using a computing device at the same location the recorded video was recorded.

32. The method of claim 20, wherein the first set of latent characteristics or the second set of latent characteristics is adjusted in real time after processing the observed user response.

33. The method of claim 20, wherein the adjustment to the first set of latent characteristics or the adjustment to the second set of latent characteristics is iteratively used in real-time to process a subsequent frame within minutes or seconds after the first set of latent characteristics or the second set of latent characteristics have been created or adjusted.

34. The method of claim 20, wherein the user is at the same location as the location where the video is generated.

35. The method of claim 20, wherein the user is at a different location from where the video is generated.

36. The method of claim 20, wherein video inputs are gathered from numerous different source cameras and the first set of latent characteristics o or the second set of latent characteristics identified by one source of cameras is used to improve the AI model for all other users.

37. The method of claim 20, wherein a multitude of AI models are generated and their effectiveness at making predictions are used to select the best AI model.

38. The method of claim 20, wherein a multitude of AI models are generated and their predictions are combined to generate a further result.

39. The system of claim 1, wherein the computer readable instructions that, upon execution by the processor, cause the processor to further observe and track a second user response of a second user to the one or more annotated frames;
   wherein the adjustment to the latent characteristics of the first set of latent characteristics or the second set of latent characteristics is further based on the second user response.

40. The system of claim 39, wherein the computer readable instructions that, upon execution by the processor, cause the processor to further observe and track additional user responses of additional users to the one or more annotated frames;
    wherein the adjustment to the latent characteristics of the first set of latent characteristics or the second set of latent characteristics is further based on the additional user responses.

41. The method of claim 1, further comprising tracking and observing a second user response of a second user to the one or more annotated frames;
    wherein adjusting the latent characteristics of the first set of latent characteristics or the second set of latent characteristics is further based on the second user response.

42. The method of claim 39, further comprising tracking and observing additional user responses of additional users to the one or more annotated frames;
    wherein adjusting the latent characteristics of the first set of latent characteristics or the second set of latent characteristics is further based on the additional user responses.

\* \* \* \* \*

UNITED STATES PATENT AND TRADEMARK OFFICE
CERTIFICATE OF CORRECTION

| | | |
|---|---|---|
| PATENT NO. | : 12,333,789 B2 | Page 1 of 1 |
| APPLICATION NO. | : 17/705346 | |
| DATED | : June 17, 2025 | |
| INVENTOR(S) | : David Lee Selinger | |

It is certified that error appears in the above-identified patent and that said Letters Patent is hereby corrected as shown below:

In the Claims

<u>Column 25, Claim 1, after Line 51:</u>
Insert the following: --identify a first set of latent characteristics in the video frames;--.

<u>Column 28, Claim 32, Line 33:</u>
"in real time after" should read: --in real-time after--.

Signed and Sealed this
Seventh Day of October, 2025

John A. Squires
*Director of the United States Patent and Trademark Office*